United States Patent
Seitz et al.

(10) Patent No.: US 9,857,164 B2
(45) Date of Patent: Jan. 2, 2018

(54) LENS DEVICE FOR A VARIABLE WORKING DISTANCE, ILLUMINATION ASSEMBLY, COORDINATE MEASURING MACHINE AND METHOD

(71) Applicant: CARL ZEISS INDUSTRIELLE MESSTECHNIK GMBH, Oberkochen (DE)

(72) Inventors: Dominik Seitz, Schwaebisch Gmuend (DE); Nils Haverkamp, Aalen (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 0 days.

(21) Appl. No.: 15/429,207

(22) Filed: Feb. 10, 2017

(65) Prior Publication Data

US 2017/0241769 A1 Aug. 24, 2017

(30) Foreign Application Priority Data

Feb. 19, 2016 (DE) .................... 10 2016 102 971

(51) Int. Cl.
| | |
|---|---|
| *G01B 11/24* | (2006.01) |
| *G01B 11/00* | (2006.01) |
| *G02B 19/00* | (2006.01) |

(52) U.S. Cl.
CPC ............ *G01B 11/005* (2013.01); *G01B 11/24* (2013.01); *G02B 19/0047* (2013.01)

(58) Field of Classification Search
CPC ........ G01B 11/005; G01B 11/24; G01B 5/24; G01B 5/008; G02B 19/0047
(Continued)

(56) References Cited

U.S. PATENT DOCUMENTS

| 4,810,875 A | 3/1989 | Wyatt |
|---|---|---|
| 4,963,728 A | 10/1990 | Hof et al. |

(Continued)

FOREIGN PATENT DOCUMENTS

| EP | 0 362 625 A2 | 4/1990 |
|---|---|---|
| EP | 0 385 262 A2 | 9/1990 |

(Continued)

OTHER PUBLICATIONS

German Examination Report with English translation; dated Nov. 7, 2016; 10 pp.

*Primary Examiner* — Hoa Pham

(74) *Attorney, Agent, or Firm* — Harness, Dickey & Pierce, P.L.C.

(57) ABSTRACT

A lens device for an illumination assembly, wherein the lens device comprises at least one ring region, wherein each ring region extends along a circumferential direction about a central axis of the lens device, wherein each ring region comprises a plurality of segments, wherein each segment forms a circular arc portion of a respective ring region and wherein each segment comprises a first end in the circumferential direction and a second end opposite to the first end in the circumferential direction, wherein each segment has a first refractive index at a reference wavelength at the first end at a first radial distance from the central axis and a second refractive index at the reference wavelength at the second end at the first radial distance, said second refractive index differing from the first refractive index. An illumination assembly, a coordinate measuring machine and a method are also disclosed.

22 Claims, 11 Drawing Sheets

(58) Field of Classification Search
USPC .......................... 356/601–623, 121–127, 128
See application file for complete search history.

(56) References Cited

U.S. PATENT DOCUMENTS

| | | |
|---|---|---|
| 5,038,258 A | 8/1991 | Koch et al. |
| 6,948,825 B2 | 9/2005 | Christoph |
| 7,535,644 B2 * | 5/2009 | De Boeij ............ G03F 7/70275 |
| | | 359/454 |
| 9,335,569 B1 * | 5/2016 | Levine ...................... G02F 1/29 |
| 9,453,718 B2 | 9/2016 | Engel |
| 2005/0225763 A1 * | 10/2005 | Rehm ................. B60T 8/17554 |
| | | 356/400 |
| 2007/0183293 A1 * | 8/2007 | Murata ..................... G02F 1/29 |
| | | 369/112.02 |
| 2014/0191129 A1 * | 7/2014 | Jang ..................... G01J 5/0022 |
| | | 250/338.3 |

FOREIGN PATENT DOCUMENTS

| | | |
|---|---|---|
| EP | 1 373 827 B1 | 1/2004 |
| WO | 2010/009852 A2 | 1/2010 |
| WO | 2013/167168 A1 | 11/2013 |

\* cited by examiner

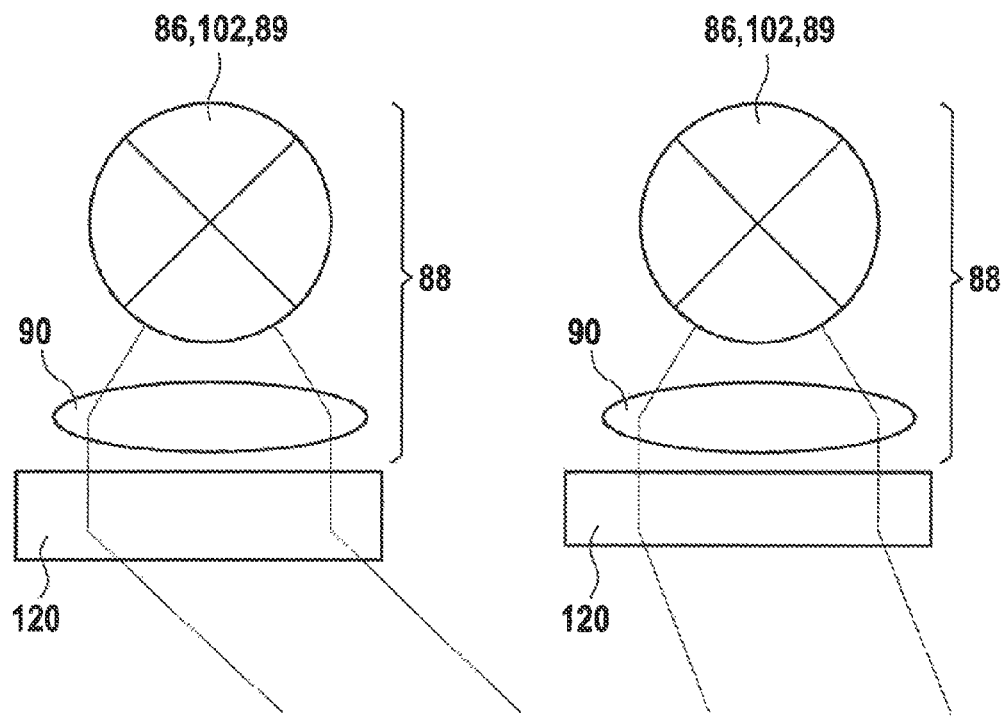
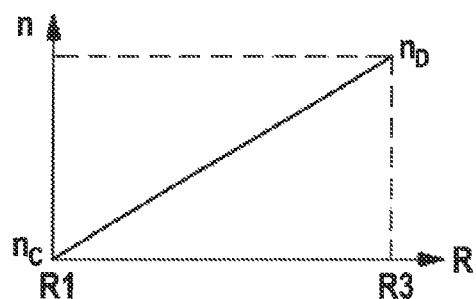
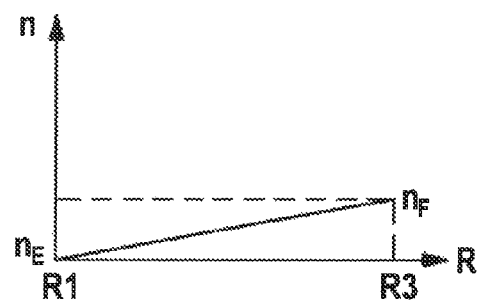
Fig. 10          Fig. 11

LENS DEVICE FOR A VARIABLE WORKING DISTANCE, ILLUMINATION ASSEMBLY, COORDINATE MEASURING MACHINE AND METHOD

CROSS-REFERENCE TO RELATED APPLICATIONS

This application claims the priority of German patent application DE 10 2016 102 971.8, filed on Feb. 19, 2016. The entire content of this priority application is incorporated herein by reference.

BACKGROUND OF THE INVENTION

The present invention relates to a lens device for an illumination assembly, in particular for a variable working distance. Moreover, the present invention relates to an illumination assembly for a measuring machine for measuring a workpiece by means of an optical sensor. Moreover, the present invention relates to a coordinate measuring machine for measuring a workpiece by means of an optical sensor. Moreover, the present invention relates to a method for modifying an illumination working distance, in particular of a dark field top light illumination of a coordinate measuring machine.

By way of example, illumination modules for coordinate measuring machines are known from the document EP 0 362 625 A2.

Coordinate measuring machines are generally known in the prior art. They serve for checking workpieces, for example as part of quality assurance, or for ascertaining the geometry of a workpiece completely as part of what is known as "reverse engineering." Moreover, multifarious further application possibilities are conceivable.

In coordinate measuring machines of this type, different types of sensors may be used to capture the coordinates of a workpiece to be measured. By way of example, sensors that measure in tactile fashion are known in this respect, as are sold, for example, by the applicant under the name "VAST", "VAST XT" or "VAST XXT." Here, the surface of the workpiece to be measured is probed with a stylus, the coordinates of said stylus in the measurement space being known at all times. Such a stylus may also be moved along the surface of a workpiece, and so a multiplicity of measurement points may be captured at set time intervals during such a measuring process within the scope of a so-called "scanning method".

It is moreover known to use optical sensors that facilitate contactless capturing of the coordinates of a workpiece. One example of such an optical sensor is the optical sensor sold by the applicant under the name "ViScan".

The sensors may then be used in different types of measurement constructions. One example of such a measurement construction is the product "O-INSPECT" by the applicant. In an appliance of this type, both an optical sensor and a tactile sensor are used to carry out various examination tasks on a machine and ideally with a single setup of a workpiece to be measured.

Sensor systems comprising optical sensors are becoming increasingly more important in coordinates metrology. Here, optical sensors are distinguished, in particular, by a high speed of the measuring process. In this way it is possible to carry out many examination tasks, for example in medical engineering, plastics technology, electronics and precision engineering. Naturally, various other application options are also conceivable.

Conventionally, the optical sensor head or the optical sensor is connected to a carrier system which supports and moves the optical sensor system. Various carrier systems are known, for example portal systems, stand systems, horizontal arm systems and arm systems, and all types of robotic systems. Here, the carrier systems may moreover comprise system components which facilitate a positioning of the sensor head which is as flexible as possible. An example for this is the articulation from the applicant sold under the name "RDS". Moreover, various adapters for connecting the various system components of the carrier system among themselves and with the sensor system may be provided.

Moreover, it is conventional in coordinate metrology that work may be conducted with different types of illumination when measuring objects. By way of example, provision may be made of reflected light illumination which, for example, may be configured as bright field illumination or as dark field illumination. By way of example, the corresponding optical sensors comprise a video camera and/or an image camera and appropriate illumination for the workpiece. Moreover, a fixed imaging optical unit is usually provided, said fixed imaging optical unit imaging the workpiece to be measured onto the camera or the optical sensors of the camera. Here, in general, provision is made of specific optical sensors comprising fixedly integrated illuminations and imaging optical units for each application or each type of measurement.

By way of example, the document EP 0 362 625 A2 exhibits an interchangeable front optical unit for an optical sensing probe. This front optical unit is embodied for a specific working distance and a specific illumination type. Moreover, it comprises the whole lens which images light rays reflected by the workpiece onto the optical sensor.

However, such a front optical unit is relatively heavy on account of the optical elements for imaging purposes and has a relatively large volume. Moreover, such a front optical unit is only usable for a specific application, i.e. at a specific working distance and for a specific illumination type.

Moreover, documents EP 0 385 262 A2 and EP 1 373 827 B1 likewise specify illumination devices for coordinate measuring machines, said illumination devices, firstly, comprising imaging optical units and, secondly, comprising e.g. swivelable or movable illumination elements with a relatively complex embodiment in order to adjust the illumination to different working distances. However, this also results in a relatively complex structure of such illumination elements and, possibly, a relatively high weight and volume which makes regulating the optical sensor head more difficult on account of the higher inertia connected therewith, in particular in the case of fast measuring processes.

Document WO 2013/167168 A1 shows an illumination module for a coordinate measuring machine for measuring a workpiece by means of an optical sensor, wherein the illumination module comprises a main body with a sensor side and a workpiece side, wherein the illumination module comprises, on the main body, at least one illumination arrangement for illuminating the workpiece and wherein the at least one illumination arrangement has an emission characteristic with an emission angle and a light-intensity curve within the emission angle, wherein the light-intensity curve of the at least one illumination arrangement is asymmetric within the emission angle.

The workpiece should be illuminated in different ways dependent on the workpiece to be examined and the measuring method applied by means of the optical sensor. In the process, it is possible, for example, for a working distance, at which the measurement process is undertaken, to vary.

Moreover, an illumination with different angles of incidence on a surface of the workpiece may be desired in certain circumstances. Therefore, in practice, illumination assemblies should either be interchanged or an illumination assembly comprises a plurality of alternately switchable light sources which provide different types of illumination. However, such arrangements make an illumination assembly heavier on the one hand and, on the other hand, increase the costs of an illumination assembly. However, it is desirable, as a matter of principle, to be able to provide illuminations at different working distances and/or with different angles of incidence by means of one illumination assembly. Particularly in the case of a desired reflected light dark field illumination at a variable working distance, it is desirable to be able to set different angles of incidence as easily as possible.

BRIEF SUMMARY OF THE INVENTION

It is an object of the present invention to specify a lens device, an illumination assembly for a coordinate measuring machine comprising an optical sensor, a coordinate measuring machine and a method, which have a simple design and facilitate the greatest possible flexibility when using the optical sensor of the coordinate measuring machine, in particular the use of different working distances in the case of a dark field top light illumination.

A lens device for an illumination assembly is provided in accordance with a first aspect of the invention, wherein the lens device comprises at least one ring region, wherein each ring region extends along a circumferential direction about a central axis of the lens device, wherein each ring region comprises a plurality of segments, wherein each segment forms a circular arc portion of a respective ring region and wherein each segment comprises a first end in the circumferential direction and a second end opposite to the first end in the circumferential direction, wherein each segment has a first refractive index at a reference wavelength at the first end at a first radial distance from the central axis and a second refractive index at the reference wavelength at the second end at the first radial distance, said second refractive index differing from the first refractive index.

In accordance with a second aspect of the invention, an illumination assembly for a measuring machine for measuring a workpiece by means of an optical sensor is provided, comprising at least one illumination arrangement and wherein, furthermore, provision is made of a lens device in accordance with the first aspect of the invention or one of the refinements thereof.

In accordance with a third aspect of the invention, a coordinate measuring machine for measuring a workpiece by means of an optical sensor is provided, wherein provision is made of an illumination assembly in accordance with the second aspect of the invention or one of the configurations thereof, and wherein a measurement cone of the optical sensor extends along the central axis.

In accordance with a fourth aspect of the invention, a method for changing an illumination working distance, in particular of a dark field top light illumination, of a coordinate measuring machine is provided, wherein the coordinate measuring machine comprises an illumination assembly comprising a lens device, wherein the lens device extends, in particular in a ring-shaped manner, along a circumferential direction about a central axis of the lens device, said method comprising the following step: rotating the lens device about the central axis, wherein the lens device comprises at least one ring region, wherein each ring region extends along a circumferential direction about a central axis of the lens device, wherein each ring region comprises a plurality of segments, wherein each segment forms a circular arc portion of a respective ring region and wherein each segment comprises a first end in the circumferential direction and a second end opposite to the first end in the circumferential direction, wherein each segment has a first refractive index at a reference wavelength at the first end at a first radial distance from the central axis and a second refractive index at the reference wavelength at the second end at the first radial distance, said second refractive index differing from the first refractive index.

This provides the advantage of a difference in the dimension of the beam deflection toward the central axis existing between the first end and the second end on account of the various refractive indices. As a result, the lens segment may provide at least two different beam deflections in the direction of the central axis, one at the first end and one at the second end. Thus, such a lens device may be used in such a way that, in particular in conjunction with a corresponding illumination arrangement, this lens device may change the illuminated working distance by a rotation about the central axis relative to the respective one of the at least one illumination arrangement. Corresponding advantages are implemented in the coordinate measuring machine. The corresponding method provides such an advantage. The working distance of the illumination is modified by a simple step of rotating the lens device.

The present invention may be used in a particularly advantageous manner for dark field top light illumination with a variable working distance. Precisely such dark field top lights typically have a ring-shaped embodiment; the lens of an optical sensor is arranged at the coordinate measuring machine. In this case, corresponding dark field reflection lights are often also referred to as ring lights. Accordingly, they have lens devices arranged around a central axis. Here, the reflected light illumination may comprise at least one light source or illumination arrangement, but, in particular, a plurality of light sources or illumination arrangements as well. By way of example, these may each comprise a collimator which collimates the light emitted by the light sources. The beam deflection in the direction of the optical axis or onto the workpiece may now be configured variably by means of the different refractive indices at the first end and the second end. In particular, as will still be explained in detail below, there may be a refractive index gradient between the first end and the second end, i.e. in the circumferential direction, in particular a continuous refractive index gradient. Further configurations with a refractive index gradient in the radial direction, in particular for use in the case of small working distances and/or a broad extent of the lens segments in the radial direction, are also explained below.

Therefore, the lens device is an optical lens element, i.e. a refractive optical element. It may be provided made of one of the conventional glass or plastic materials for refractive optical elements. As a matter of principle, such a lens device comprises two optically effective surfaces. These are denoted light-entry surface and light-exit surface.

According to one of the present application, a "reference wavelength" is understood to mean that wavelength of the light to which the specification of the refractive index refers. By way of example, the refractive index in the form $n_e$ may be specified in relation to the n-line, i.e. a wavelength of 546.074 nm. However, as a matter of principle, other reference wavelengths are also conceivable. By way of example, the refractive index may also be specified as $n_D$ at a reference wavelength of 589 nm, i.e. on the sodium D-line.

In principle, the lens device for beam deflection may be manufactured as a rotationally symmetric component. Then, a radial gradient of the refractive index may also be provided in addition to the change in the refractive index in the circumferential direction or tangential direction, particularly in the case of a great extent in the radial direction. As will still be explained in more detail below, the lens device may also comprise a plurality of ring regions in the radial direction, each having a different radial distance from the central axis. The segments may each have a refractive index gradient in the radial direction as well such that, overall, a stepped or graduated curve of the refractive index emerges in the radial direction over the entire lens device.

In principle, a constant gradient of the refractive index may be provided in the circumferential direction between the first end and the second end. However, as a matter of principle, other gradients are also possible. An example would be a linear gradient, which leads to a quadratic curve or a second-order curve of the refractive index. In principle, the lens device may have plane parallel light-entry surfaces and light-exit surfaces. However, in conjunction with an illumination arrangement, there should then be such an arrangement that an angle of incidence on the light-entry surface is less than 90°. That is to say the light rays emitted by an illumination arrangement should not be incident on the light-entry surface at a right angle as there is no differential beam deflection despite the different refractive indices in the case of a plane parallel alignment of light-entry surfaces and light-exit surfaces.

The lens device comprises at least one ring region. In principle, it may comprise exactly one ring region or more than one ring region. Each ring region is a portion or segment of a ring, or a completely closed ring. Hence, in the center thereof, the lens device has a cutout or a free area through which the light rays may pass, in particular in order to reach the optical sensor of a coordinate measuring machine. Consequently, each ring region extends, in particular in a ring-shaped manner, along a circumferential direction about a central axis. Therefore, the location of the central axis is determined from the radius with which the ring regions extend along the circumferential direction about the central axis. Consequently, the central axis lies at the center point of the ring in the case of at least one ring region which extends in a completely closed manner as a ring. Each ring region extends along the circumferential direction about the central axis. Consequently, the central plane of each ring region or, in the case of planar configuration of the light-entry surface, the light-entry surface lies perpendicular to the central axis. Hence, the central axis may extend parallel to the direction through which radiation passes through the lens device.

A "working distance" may be understood to mean, firstly, the mechanical working distance, i.e. the distance between the object to be measured which is to be observed and the measuring device. However, it may also be understood to mean the optical working distance, i.e. the clear space between the object to be measured and the first interference contour in the beam path of the optical sensor, for example a stop at an entry to the lens or an imaging optical unit.

In a first refinement of the lens device, provision may be made for each segment to have a refractive index gradient with a magnitude different from zero in the radial direction.

Expressed differently, the refractive index therefore also varies in the radial direction. This may be advantageous, in particular, if the radial extent of a segment is large and/or a desired illumination angle requires a pronounced deflection, i.e. in the case of short working distances. In this case, the radial extent of the segment may require different angles of deflection radially on the inside and radially on the outside.

In a further refinement of the lens device, provision may be made for each segment to have a refractive index gradient with a magnitude of zero in the radial direction. In particular, the lens device in this case may have a plurality of ring regions.

Particularly in the case of a plurality of ring regions, and particularly if the two segments only extend slightly in the radial direction and/or in the case of large working distances, i.e. in the case of small required beam deflections, the necessity of different beam deflections in the radial direction may optionally be neglected or may play no role. A refractive index gradient of zero may be provided in the radial direction in this case. In other words, each segment has a constant curve of the refractive index in the radial direction. Then, there is only a variation of the refractive index in the circumferential direction between the first end and the second end.

In a further refinement of the lens device, provision may be made for the segment to have a first constant refractive index gradient in the radial direction at the reference wavelength at the first end and a second constant refractive index gradient, differing from the first refractive index gradient, at the reference wavelength at the second end.

At least different refractive index gradients may be provided for different external distances in order to illuminate the working distances in an ideal manner.

In a further refinement of the lens device, provision may be made for each lens segment to have a constant refractive index gradient in the circumferential direction between the first end and the second end.

Consequently, a linear curve of the refractive index follows in the circumferential direction. This provides the particular advantage that the continuous transition is provided with a linear curve. Various working distances may therefore be illuminated without steps by way of rotating.

In a further refinement of the lens device, provision may be made for the lens device to comprise a light-entry surface and a light-exit surface, wherein the light-entry surface and the light-exit surface extend parallel to one another.

This results in a structurally simple design. As already explained briefly at the outset, care may have to be taken here for light rays to be incident on the light-entry surface at an angle of less than 90°.

In a further refinement of the lens device, provision may be made for the lens device to comprise a light-entry surface and a light-exit surface, wherein the light-exit surface is inclined in the direction of the central axis by any constant angle in relation to the light-entry surface.

Thus, for example, provision may already be made of a certain "basic deflection". The variation thereof is effected by way of the various refractive indices. At the same time, this ensures that there always is a beam deflection.

In a further refinement of the lens device, provision may be made for the lens device to comprise a light-entry surface and a light-exit surface, wherein the light-exit surface is inclined in the direction of the central axis by any constant first angle in relation to the light-entry surface at the first end and wherein the light-exit surface is inclined in the direction of the central axis by any second angle, which differs from the first angle, in relation to the light-entry surface at the second end.

In this way, an additional variation on account of the different angles between the first end and the second end may be provided in addition to a basic deflection. However, this is merely optional. Thus, a variation of the beam deflection may be provided in addition to the curve of the refractive index by way of the inclination angle between light-entry surface and light-exit surface. Optionally, greater regions of working distances may be passed over thus by the combined effect of the change of the angle between entry surface and exit surface and the refractive index variation.

In a further refinement of the lens device, provision may be made for each segment to be integral and have a material which is inhomogeneous in relation to a refractive index.

In this way, each segment may be formed from a single material part without a broad joining operation.

In a further refinement of the lens device, provision may be made for each segment to be embodied as a number of parts which, overall, comprise at least two different materials.

By a multi-part configuration of each segment as a result of selecting different materials and different refractive indices for the respective parts, this may facilitate providing a plurality of refractive indices in a poor segment, in particular a first refractive index at the first end and a second refractive index at the second end. However, under certain circumstances this does not allow the provision of a continuous curve of the refractive index in the circumferential direction and/or in the radial direction. Then, jumps in the refractive index may occur at the material transitions.

In a further refinement of the lens device, provision may be made for the segments of a respective ring region to be arranged immediately adjoining one another.

In particular, this may be provided if a ring region is in a completely closed ring. However, provision may also be made for the segments not to immediately adjoin one another. By way of example, a gap may be formed between neighboring segments. In a further configuration of the lens device, provision may be made for at least one ring region to be a completely closed ring and/or for at least one ring region to be a portion of a ring.

Hence, a ring region need not extend completely or through 360° around the central axis. In fact, a ring region may also be only a portion or segment of a closed ring. This always also depends on the type and arrangement of the illumination arrangements. By way of example, provision may be made for the illumination arrangements not to be distributed uniformly about the circumference. By way of example, provision may also be made for a number of illumination arrangements to be arranged in semi-circular fashion at a first radial distance from the central axis and for a second number of illumination arrangements to be arranged in semi-circular fashion at a second radial distance which differs from the first radial distance. Then, for example, it would only be necessary for a ring region to extend only over 180° and be the portion of a ring. Then, such a ring region would be arranged at the first radial distance and a further ring region would be arranged at the second radial distance. Alternatively, despite all of this, provision could naturally also be made for two ring regions at different radial distances, said ring regions each being a completely closed ring.

In a further refinement of the lens device, provision may be made for each ring region to be a completely closed ring.

Hence, in this refinement, either provision is made of a single ring region which is a completely closed ring or provision is made of a plurality of ring regions which are arranged concentrically about the central axis at different radial distances.

Moreover, provision may be made in one refinement of the lens device for the lens device to comprise a plurality of ring regions which are arranged concentrically about the central axis.

In a further refinement of the lens device, provision may be made for at least two of the plurality of ring regions to be arranged at different radial distances from the central axis.

Here, each ring region may be a completely closed ring. A plurality of segments is provided in each ring region. Then, the segments may be arranged immediately adjoining one another or neighboring one another with a gap therebetween. In particular, provision may be made for a plurality of ring regions to be provided, said ring regions being completely closed rings with segments immediately adjoining one another. Since the surfaces with which the segments abut against one another are not optically effective surfaces, it is possible, for example, to manufacture the segments individually and then combine the ring regions to form the completed lens devices. By way of example, the segments may be contact-bonded to one another. Adhesive bonding is also conceivable. In a further configuration of the lens device, provision may be made for the lens device overall to have the form of a closed ring which is arranged around the central axis.

Hence, the lens device in this case is made from at least one ring region or a plurality of ring regions, each of which is a completely closed ring.

In a further refinement of the lens device, provision may be made for the lens device to comprise a free central region radially within the at least one ring region. The free central region may also be referred to as "cutout" or "free space".

Hence, radiation may pass through the lens device to the optical sensor in this free central region without being refracted in the process.

In a further refinement of the lens device, provision may be made for the segments of a respective ring region of the at least one ring region being identical.

This lends itself, in particular, in the case of a symmetrical and uniform distribution of the illumination arrangements around the circumference. This facilitates particularly cost-effective manufacturing of the lens segment.

In a further refinement of the illumination assembly, provision may be made for the illumination assembly to have a plurality of illumination arrangements, and wherein an illumination arrangement is assigned to each segment. In particular, exactly one illumination arrangement is assigned in the segment.

In this way, it is possible to provide a plurality of illumination arrangements, for example illumination arrangements distributed over the circumference. Here, each segment acts just like an illumination arrangement, and so the lens device is used to the best possible extent.

In one refinement of the illumination assembly, provision may be made for the at least one illumination arrangement to comprise a light source, in particular an LED, and/or for the illumination arrangement to be a light-exit surface of an optical waveguide.

As a matter of principle, the "illumination arrangement" is not necessarily an illumination arrangement with a light source. In principle, any individual light-exit surface should be understood to be the illumination arrangement. The illumination arrangement of the illumination assembly may comprise a dedicated light source. However, in principle, an external light source may also be provided in the coordinate measuring machine and the light radiation is emitted by the illumination arrangement via the light-source guide as light-emitting element. Therefore, this may be an active illumination arrangement, i.e. an illumination arrangement comprising a dedicated light source, or a passive illumination arrangement, i.e. an illumination arrangement which is fed by an external light source not belonging to the illumination arrangement. In general, an illumination arrangement will also comprise a collimator in addition to the light-emitting element before the light is incident on the lens device. This causes collimated light radiation to be incident on the lens device or be incident on the light-entry surface there. Naturally, other light sources are also conceivable in addition to LEDs, for example OLEDs, lasers, any type of white-light source or sources emitting other types of light radiation.

In a further refinement of the illumination assembly, provision may be made for the illumination assembly moreover to comprise at least one drive device for rotating the lens device about the central axis relative to the at least one illumination assembly. Thus, provision may be made of at least one drive device. In particular, provision may be made of even more drive devices which, for example, are distributed uniformly over the circumference. Here, the drive device may rotate the lens device by way of example by force fit by way of wheels which are in contact with the lens device. Other connections may also be provided in order to avoid the slip of a loss of step. By way of example, the lens device may be held by teeth and these teeth may engage with the drive device either directly or indirectly.

In a further refinement of the illumination assembly, provision may be made for the lens device to be arranged relative to the at least one illumination arrangement such that light emitted by the illumination arrangement is incident on the lens device at an angle of less than 90°.

Expressed differently, the emitted light radiation is not incident perpendicular on the light-entry surface. In this way, a beam deflection may be initiated in any case.

It is understood that the aforementioned features and those yet to be explained below may be used not only in the respectively specified combination but also in other combinations or on their own, without departing from the scope of the present invention.

BRIEF DESCRIPTION OF THE SEVERAL VIEWS OF THE DRAWING

Embodiments of the invention are depicted in the drawing and explained in more detail in the following description. In the figures:

FIG. 10 shows an exemplary curve of the refractive index between points C and D in FIG. 9, FIG. 11 shows an exemplary curve of the refractive index between points E and F in FIG. 9.

DETAILED DESCRIPTION OF THE INVENTION

Figure 1:
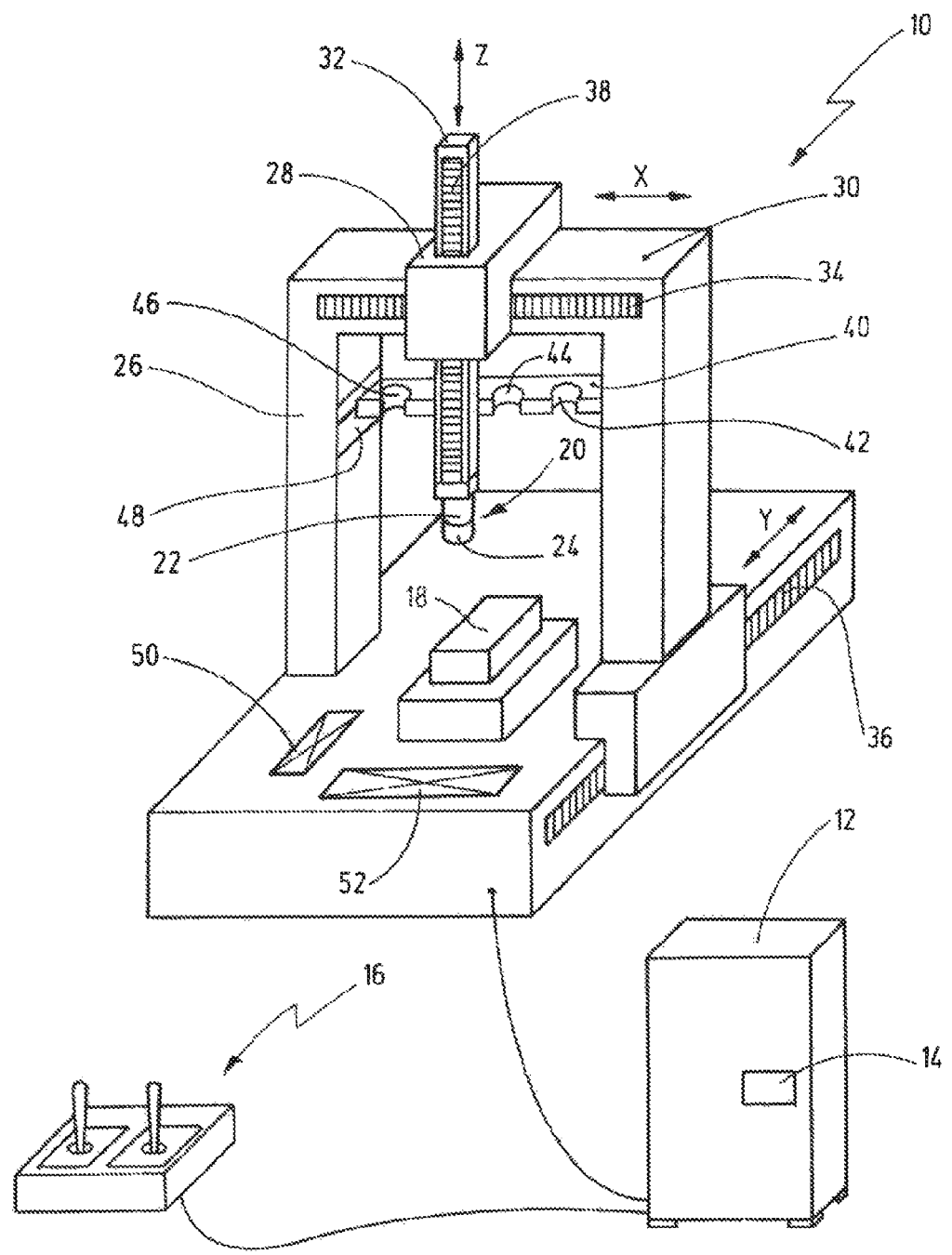
FIG. 1 shows an embodiment of a coordinate measuring machine.

FIG. 1 shows an embodiment of a coordinate measuring machine 10. The coordinate measuring machine 10 comprises a regulating device 12 which is embodied to control the coordinate measuring machine 10 in an automated manner. To this end, the regulating device 12 may comprise a data processing unit 14. Moreover, the regulating device 12 may also comprise indication apparatuses which indicate information items about selected modes of operation, measurement results, etc. to a user of the coordinate measuring machine 10. Moreover, the coordinate measuring machine 10 comprises an operating device 16 which allows a user to control the coordinate measuring machine 10. Here, the operating device 16 is only depicted schematically. On the one hand, this should facilitate manual movement of the coordinate measuring machine 10. Moreover, the operating device 16 may be embodied to allow the user to enter system inputs into the regulating device 12 in order to select a mode of operation, etc. Moreover, the regulating device 12 may also automatically regulate the coordinate measuring machine 10.

The coordinate measuring machine 10 serves to measure a workpiece 18. To this end, the coordinate measuring machine 10 comprises an optical sensor head 20, the latter comprising an optical sensor 22 and an illumination assembly 24. The illumination assembly 24 is coupled to the optical sensor 22.

In order to be able to move the optical sensor head 20 relative to the workpiece 18, the coordinate measuring machine comprises a portal 26 in the embodiment depicted here, said portal being movable in a Y-direction. A carriage 28 is mounted in a manner movable in an X-direction at a crossbeam 30 of the portal 26. In this way, the optical sensor head 20 may be moved in the X-direction by moving the carriage 28 on the crossbeam 30. A quill 32 is provided in the carriage 28, said quill being movable relative to the carriage 28 in a Z-direction. Then, the optical sensor head 20 is attached to the quill 32. In this way, it is possible to move the optical sensor head 20 in all three spatial directions X, Y and Z. A mount of the portal 26, the carriage 28 and the quill 32 relative to one another may, for example, be embodied by means of so-called air bearings. The coordinate measuring machine 10 may have scales in order to capture the location of the portal 26, the carriage 28 and the quill 32. By way of example, provision may be made of a scale 34 for the X-direction, a scale 36 for the Y-direction and a scale 38 for the Z-direction.

Moreover, the coordinate measuring machine 10 may comprise a holding device 40. At least one storage space is provided, in particular a plurality of storage spaces are provided, in the holding device 40. A first storage space 42, a second storage space 44 and a third storage space 46 are depicted. Each storage space 42, 44, 46 may be provided to carry a specific illumination assembly 24. Interchanging of an illumination assembly 24 may then be carried out, for example, in such an automated manner that the regulating device 12 puts down a currently coupled illumination assembly 24 into one of the storage spaces 42, 44, 46 and picks up a further illumination assembly (not depicted here) from another storage space 42, 44, 46.

In the embodiment depicted here, the holding device 40 is attached to the portal 26 such that the holding device 40 extends below the crossbeam 30 and parallel to the crossbeam 30 in the X-direction. Alternatively, provision may, for example, also be made for the holding device 40 to be attached directly to the crossbeam 30. Travel paths for interchanging an illumination assembly 24 may be kept particularly short by an appropriate arrangement of the holding device 40. However, as is visible from the depicted view, there is initially no option for displacing the optical sensor 22 and the holding device 40 relative to one another in the Y-direction in the depicted arrangement. Hence, in the illustrated embodiment, the holding device 40 is mounted on a carriage 48 in the portal 26 such that relative movement of the holding device 40 in the Y-direction in relation to the optical sensor 22 becomes possible. Here, the holding device 40 is moved relative to the portal 26 of the carriage 48 in the Y-direction.

Naturally, alternative arrangements of the holding device 40 are moreover conceivable. By way of example, it is possible for the holding device 40 to be positioned at the schematically indicated setup points 50, 52. Then, it stands freely in the coordinate measuring machine 10. Then, the storage spaces 42, 44, 46 may be approached freely by the optical sensor 22 in order to put down or pick up an illumination assembly 24.

Figure 2:
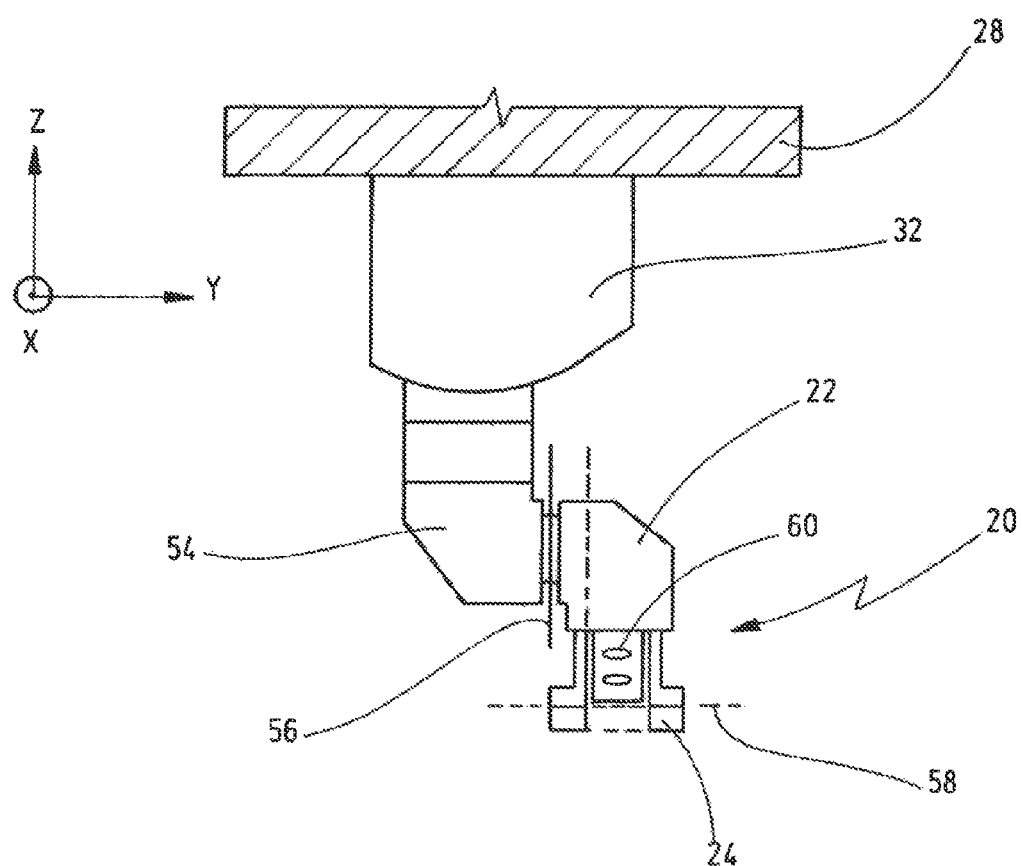
FIG. 2 shows a side view of an optical sensor of the coordinate measuring machine comprising an illumination assembly.

FIG. 2 shows a schematic detailed view of part of the coordinate measuring machine 10. Once again, the carriage 28 and the quill 32 are depicted in a schematic manner. As may be gathered from FIG. 2, e.g. a so-called articulation unit 54 may be arranged on the quill 32, said articulation unit facilitating a rotation of the optical sensor 22 about two axes, in particular about e.g. both the Z-direction and the Y-direction in the depicted embodiment. In this way, the optical sensor 22 may be aligned in a multiplicity of directions in order to observe the workpiece 18 from a desired observation angle. Here, various system components are coupled by way of interchange surfaces 56; by way of example, the optical sensor 22 is coupled to the articulation unit 54 by means of an interchange surface 56. Electrical supply lines, communication interfaces, optical interfaces, etc., are provided over the interchange surface 56 in order, firstly, to supply the optical sensor 22 with power and, secondly, to be able to irradiate the workpiece 18. Furthermore, the data captured by the optical sensor 22 is guided over the interchange surface 56 and the interfaces provided there to the regulating device 12 and the data processing unit 14 thereof.

The illumination assembly 24 is coupled to the optical sensor 22 along a first interface device 58. In the depicted embodiment, the illumination assembly 24 has the form of a circular ring. Moreover, the optical sensor 22 also comprises an imaging optical unit 60 which serves to image light radiation received by a workpiece 18 onto the optical sensor 22.

The configuration of the illumination assembly 24 is explained below in view of the further figures.

Figure 3:
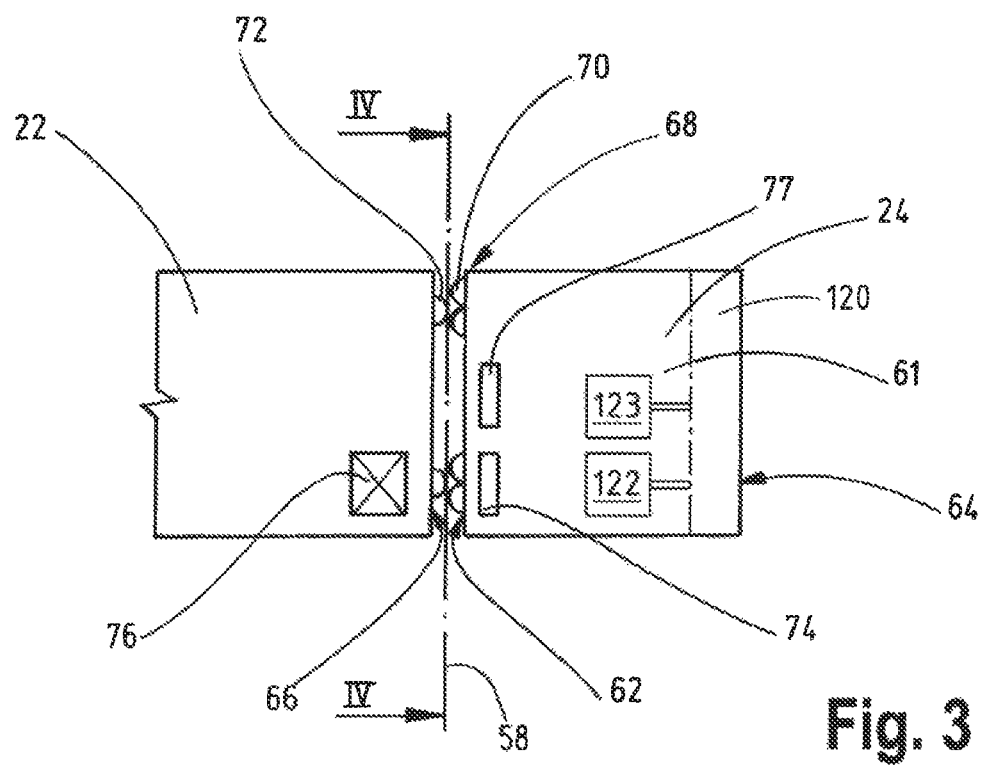
FIG. 3 shows a magnified view of an illumination assembly coupled to an optical sensor.

FIG. 3 schematically depicts the illumination assembly 24. It is coupled to the optical sensor 22. The illumination assembly 24 comprises a main body 61. The main body 61 in turn comprises a sensor side 62 which faces the optical sensor 22. Opposite the sensor side 62, the main body 61 comprises a workpiece side 64, which faces the workpiece 18 during operation. By way of example, in the coupled state, the sensor side 62 of the main body 61 lies opposite a coupling side 66 of the sensor 22. Moreover, the illumination assembly 24 comprises a lens device 120 which is still explained in more detail below. Moreover, provision may be made of a drive device 122 which is embodied to rotate the lens device 120, in particular relative to at least one illumination arrangement. Moreover, provision may be made of a drive device 123 which is embodied to move at least the lens device 120 and/or further elements of the illumination assembly relative to the imaging optical unit 60 in a manner parallel to an optical axis of the imaging optical unit and/or parallel to the central axis 124. In this way, an optical working distance may be maintained and an angle of incidence of the illumination radiation in relation to the central axis may be modified.

A three-point bearing 68 is provided for coupling the coupling side 66 of the optical sensor 22 and the sensor side 62 of the main body 61. In terms of the principles thereof, such a three-point bearing is known to a person of average skill in the art and it serves to couple the illumination assembly 24 in an unambiguous position in relation to the optical sensor 22. To this end, three-point bearing elements 68 are provided at the sensor side 62 of the illumination assembly 24 and three-point bearing elements 72 are provided at the coupling side 66 of the optical sensor 22. By way of example, here, provision is made for a bearing by way of ball pairs, ball-roller pairs or a bearing in depression for the first ball, a bearing in a V-groove for the second ball and a bearing on a surface for the third ball of the three-point bearing.

In order to apply the necessary holding force which holds the illumination assembly 24 and the optical sensor 22 together, provision may be made for a permanent magnet 74 to be provided in the main body 61. Here, the permanent magnet 74 is arranged in such a way that the magnetic field lines extend through the optical sensor 22 via the first interface device 58 such that a suitable holding force is provided between the illumination assembly 24 and the optical sensor 22. Naturally, the magnetic field lines must extend through a ferromagnetic material in the optical sensor 22 in the process. A further permanent magnet or an electromagnet (not depicted here) may also be present in the optical sensor in order to apply the necessary holding force together with the permanent magnet 74. Naturally, provision may additionally also be made for additional permanent magnets to be provided in the illumination assembly 24 and/or in the optical sensor 22. Naturally, provision may also be made for the permanent magnet 74 to be provided only in the optical sensor 22.

Moreover, provision may be made for the optical sensor 22 to comprise a switchable electromagnet 76. Here, it is configured in such a way that it at least partly neutralizes a magnetic field applied by the permanent magnet 74, and so the illumination assembly 24 may be separated more easily from the optical sensor 22. Naturally, provision may also be made for one or more electromagnets to be arranged in the illumination assembly 24. In order to be able to avoid the necessity of supplying energy to the illumination assembly 24, the electromagnet may be provided in the optical sensor 22.

Moreover, a power reception device 77 may also be provided in the illumination assembly 24, said power reception device being coupled to the first sensor 22 via the first interface device 58, either in a wireless or in a wired manner, such that the illumination assembly 24 is provided with a power supply.

Figure 4:
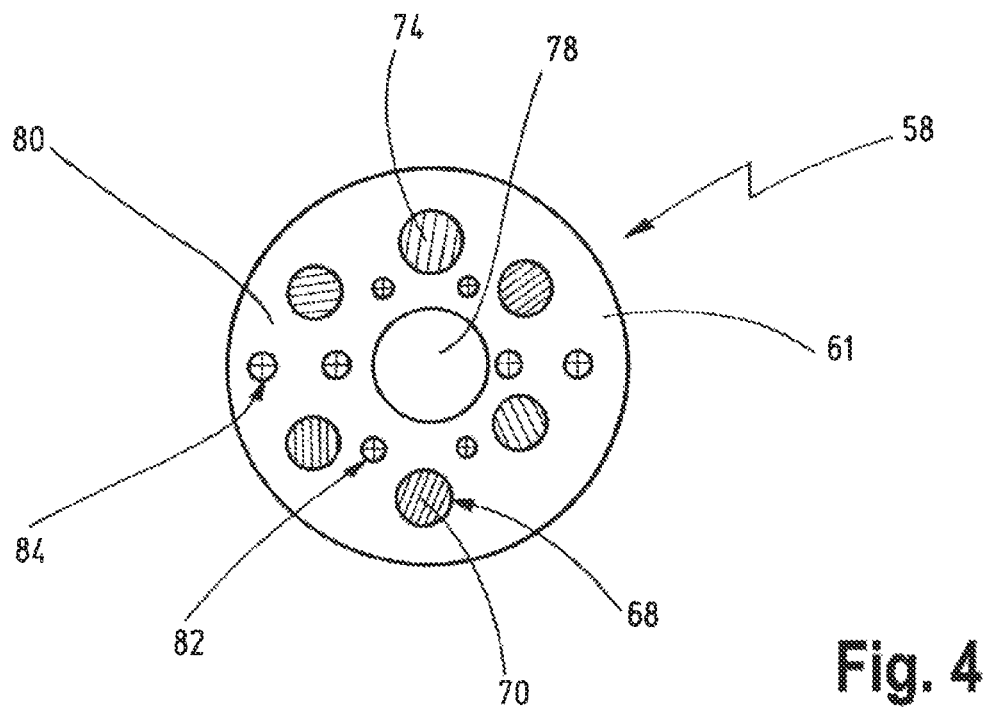
FIG. 4 shows a section along the line IV-IV in FIG. 3, FIGS. 5a-5c show various embodiments of an illumination assembly.

FIG. 4 shows a cross-sectional view along a line IV-IV in FIG. 3.

As may be identified in the cross section of FIG. 4, the main body 61 has the shape of an annulus. Expressed differently, the main body 61 substantially has the form of a cylinder with a central cutout. In this respect, the main body 61 of the illumination assembly 24 comprises a free central region 78, which forms the cutout. Moreover, the main body 61 comprises an edge region 80. In the depicted view, the lens device 120 is covered by the main body 61. Then, the edge region 80 comprises the first interface device 58 with, in the depicted embodiment, e.g. three permanent magnets 74 and further optical interfaces 82 for guiding light from the optical sensor 22 into the illumination assembly 24, and electrical interfaces 84 for supplying the illumination assembly 24 with power. In FIG. 4 and the subsequent figures, the three-point bearing is only depicted in a schematic manner.

Naturally, the embodiment depicted in FIG. 4 should merely be understood to be exemplary. By way of example, an illumination assembly 24 only comprising passive illumination arrangements may also have no electrical interfaces 84 in the edge region 80. Furthermore, it is possible that an illumination assembly 24 only comprising active illumination arrangements comprises no optical interfaces 82 in the edge region 80.

Figure 5A:
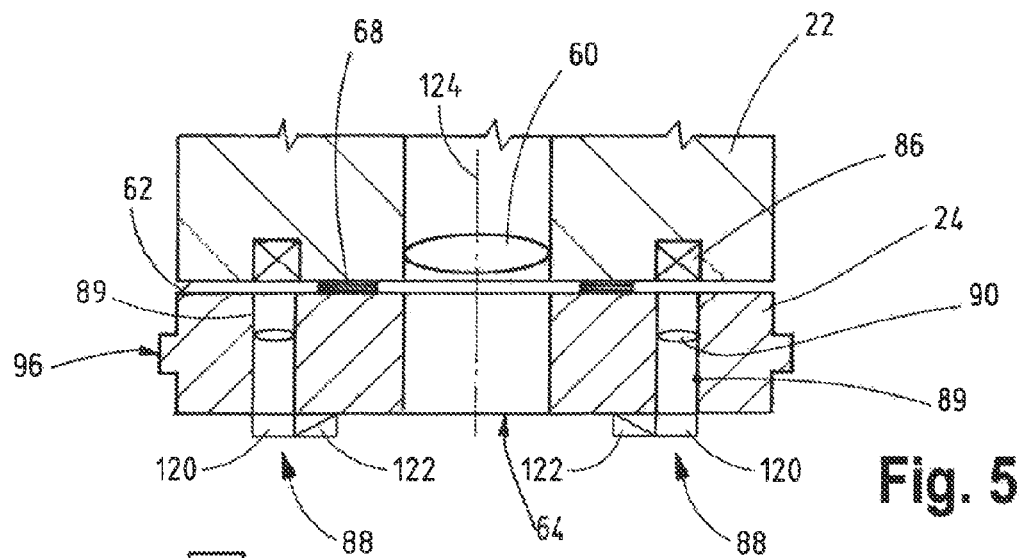

A first embodiment of an illumination assembly 24 is depicted in an exemplary manner in FIG. 5a. The same elements have been denoted by the same reference signs and will not be explained again below.

In the depicted embodiment, the optical sensor 22 comprises at least one light source 86. By way of example, the light sources 86 may be embodied as a plurality of punctiform light sources, for example as LEDs or OLEDs or lasers, which have a ring-shaped arrangement, in particular which are distributed uniformly over the circumference of a central axis 124.

The illumination assembly 24 comprises a plurality of illumination arrangements 88. The illumination arrangements 88 have merely a passive embodiment. By way of example, the illumination arrangements 88 each comprise an optical waveguide 89 and each may moreover comprise optical elements 90, for example refractive optical elements, diffractive optical elements, reflecting optical elements and/or holographic optical elements. However, this is not necessarily the case. Arbitrary combinations such optical elements are conceivable for providing a desired illumination by means of the illumination arrangement 88. Moreover, a plurality of illumination arrangements arranged in a rotationally symmetric or circular manner are naturally also conceivable in place of an optical waveguide 89; here, the illumination arrangements may be active or passive. The light emitted by the light source 86 is coupled into the optical waveguide 89, guided through the illumination assembly 24 and deflected as desired such that, ultimately, a suitable illumination of the workpiece 18 is provided by means of the illumination assembly 24. Moreover, the illumination assembly 24 comprises an interchange interface device 96 which, in the depicted embodiment, is embodied as a circumferential projection. Then, the circumferential projection may, for example, interact with a circumferential groove in a storage space 42, 44, 46 of the holding device 40 such that, for example, the illumination assembly 24 may then be pushed into such a storage space.

Figure 5B:
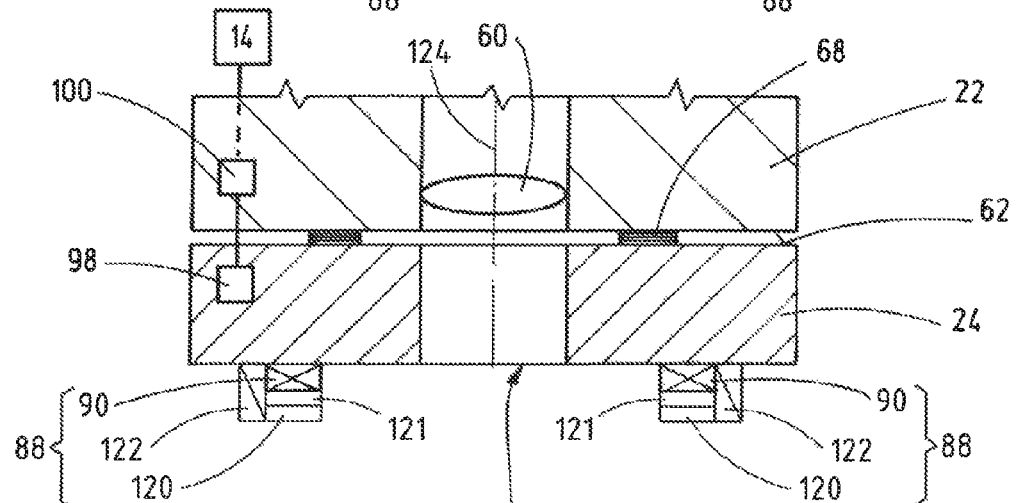

A further embodiment of an illumination assembly 24 is depicted in FIG. 5b. Again, the same elements are denoted by the same reference signs. Therefore, only the differences are discussed.

The illumination assembly 24 comprises an identifying device 98 which may be read by an identification reading device 100. Here, reading may be carried out in a wired or else wireless manner. The identification reading device 100 may be arranged in the optical sensor 22. However, it may be arranged in any other element of the coordinate measuring machine 10. It may also directly be part of the regulating device 12 or the data processing unit 14. In this way, it is possible to uniquely identify the illumination assembly 24 and provide this information item to the regulating device 12. Firstly, this serves to identify the coupled illumination assembly 24 and the illumination type thereof, and secondly, for example, it is also possible for dimensions of the illumination assembly 24 to have been stored in the identifying device 98 and for these to be read out in order, in this way, to facilitate a collision-free regulation of a movement of the optical sensor 22 coupled to the illumination assembly 24.

In the depicted embodiment, the illumination assembly 24 is configured as a so-called active illumination assembly. It comprises two light sources 102, and so the illumination assembly 24 in FIG. 5b comprises two illumination arrangements 88.

In particular, the light source 102 may be embodied using energy-saving LED/OLED technology or as a laser. By way of example, the light sources 102 may be used in groups, separated according to colors, in a continuous wave operation or in a pulsed operation. If many different light sources are intended to be used, it is advantageous to provide a control device directly in the illumination assembly 24. Accordingly, an electrical interface for supplying such a control device with power and control signals should be provided by way of the first interface device 58. Here, the supply with electrical power may have a wireless or wired embodiment. In particular, provision may moreover be made for an energy supply for a control device and an energy supply for the light sources 102 to have embodiments that are separate from one another. Moreover, provision may be made of collimators 121 for collimating the emitted light before incidence on the lens device 120. If the lens device 120 comprises a light-entry surface which is parallel to a light-exit surface, the lens device 120 may be arranged relative to the illumination arrangement or the collimators 121 in such a way that the collimated light is incident on the light-entry surface at an angle of less than 90°. Thus, the different refractive indices of each segment may bring about the desired varying beam deflection in the direction of a central axis of the lens device 120.

Figure 5C:
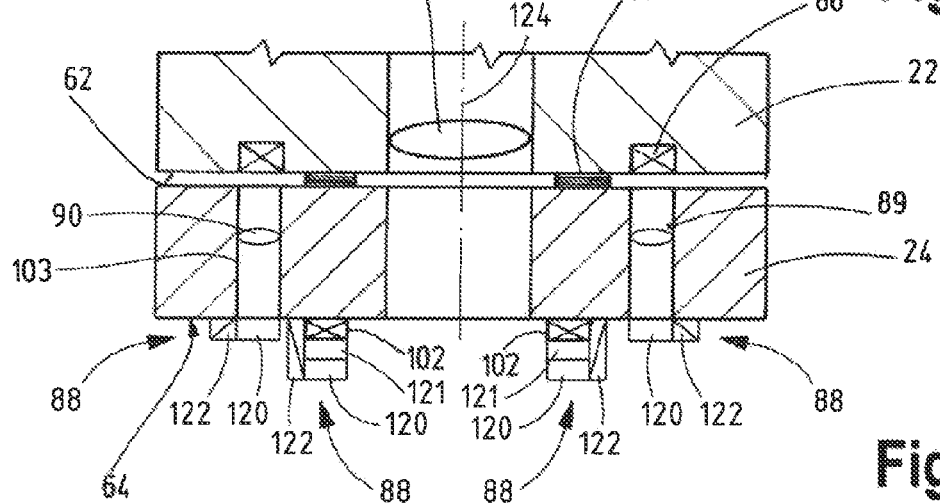

An even further embodiment of an illumination assembly 24 is depicted in FIG. 5c. The illumination assembly 24 in FIG. 5c comprises both active and passive illumination arrangements 88 in combination. By way of example, in the depicted example, two illumination arrangements 88 are provided only by means of two optical waveguides 89, 103, which guide the light emitted by the light source 86 of the optical sensor 22 through the illumination assembly 24. Furthermore, two illumination arrangements 88, which are respectively provided as active light-emitting light sources 102, are provided in a supporting role.

Hence, the illumination assembly 24 according to the invention may comprise passive illumination arrangements, active illumination arrangement or both active and passive illumination arrangements 88.

Figure 6:
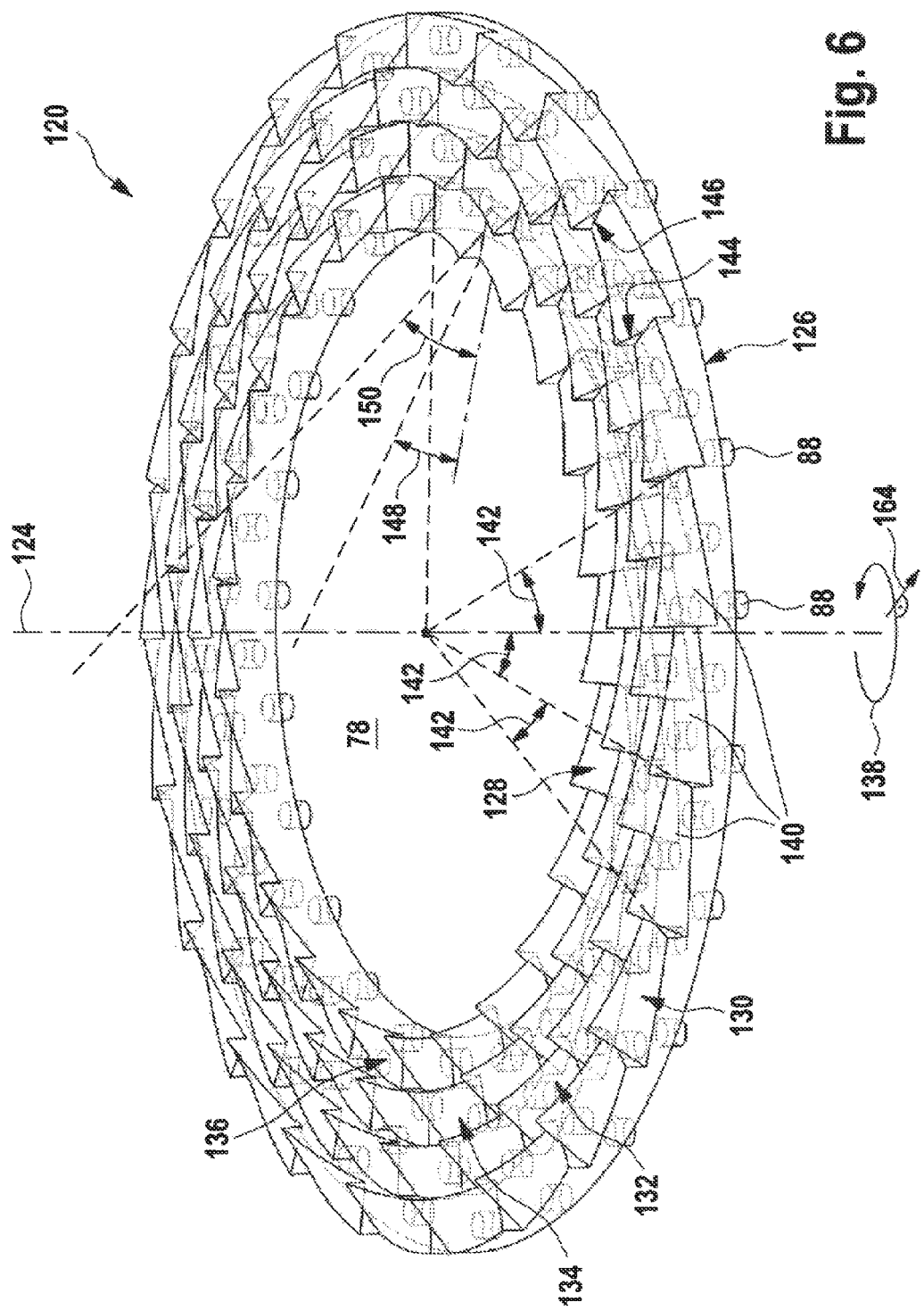
FIG. 6 shows an isometric view of an embodiment of a lens device.

FIG. 6 shows an embodiment of a lens device 120. The depicted lens device 120 extends in a ring-shaped manner about a central axis 124. The lens device 120 comprises a light-entry surface 126 and a light-exit surface 128. The light-entry surface 126 and the light-exit surface 128 are the optically effective surfaces of the lens device 120. In the depicted embodiment, lens device 120 comprises four ring regions 130, 132, 134 and 136. In general, the lens device 120 comprises at least one ring region 130. Each ring region 130 to 136 may be only a portion of a completely closed ring or a completely closed ring. All four ring regions 130 to 136 are completely closed rings in the depicted embodiment. The ring regions 130 to 136 extend concentrically around the central axis 124 at different radial distances. A circumferential direction around the central axis 124 is denoted by 138. Each ring region extends around the central axis 124 in the circumferential direction 138.

Each ring region 130 to 136 comprises a plurality of segments 140. Each segment 140 forms a circular arc portion 142 of a respective ring region. By way of example, if a completely closed ring region, in which the segments 140 are arranged immediately adjoining one another, comprises a total of 24 segments, each one of these segments extends over an angle of arc of 15°. However, this should merely be understood to be exemplary. Naturally, other subdivisions may also be undertaken.

In the illustration of FIG. 6, the individual segments are depicted with inclined surfaces for elucidating the various refractive indices. However, this only serves for elucidation. In principle, each segment 140 may extend plane parallel to the light-entry surface 126 in a light-exit surface, i.e. a surface pointing upward in FIG. 6. However, for example, light-exit surfaces 128 may also simply have a constant angle of inclination relative to the light-entry surface 126. As may be identified, each segment 140 takes up one circular arc portion 142. Hence, a first end 144 and a second end 146 emerges for each segment in the circumferential direction. An illumination arrangement 88 is assigned in each segment 140. By way of example, the first end 144 has a high refractive index in the depicted configuration. In the simplified example, the curve of the refractive index may be constant in the radial direction, i.e. a refractive index gradient in the radial direction is zero. Hence, a high refractive index is present at the first end 144. A low refractive index is present at the second end 146. The high refractive index at the first end 144 is visualized by a steep surface; the low refractive index at the second end 146 is visualized by a relatively flat surface. Hence, the higher refractive index at the first end 144 leads to a stronger beam deflection. Thus, a light ray is refracted at a first angle 148 in relation to a perpendicular to the central axis 124 and to a smaller working distance. The lower refractive index at the second end 146 may lead to a larger angle 150 in relation to a perpendicular to the central axis 124 and to a greater working distance. However, the visualization in FIG. 6 is merely schematic. In principle, provision may, for example, also be made for the lower refractive index to be provided at the first end 144 and the higher refractive index to be provided at the second end 146.

In particular, an illumination arrangement 88 may be assigned to each segment 140. The illumination arrangement 88 may be "active", for example a light source such as an LED, OLED or a laser. In principle, further optical elements, such as collimators or the like, may be arranged in each case between the light source and the lens device. However, the illumination arrangement 88 may also be a "passive" illumination arrangement, for example the light-exit surface of an optical waveguide which supplies light from a light-emitting element situated at a distance. By way of example, provision may also be made for a plurality of optical waveguides to proceed from a single light-emitting element, said plurality of optical waveguides feeding the illumination arrangements 88.

Thus, an illumination arrangement 88 is assigned to each segment 140. Now, it becomes possible to modify the angle through which the lens device 120 deflects the light from the illumination arrangements 88 in respect of the central axis 124 by rotating the lens device 120 about the central axis 124. By way of example, all illumination arrangements are arranged in the vicinity of the respective first end 144 of each segment 140 in a first position. By rotating, it is possible to reach a second position, in which each illumination arrangement 88 is arranged in the vicinity of the respective second end 146 of a segment 140. Thus, the first refractive index 148 or $n_A$ acts in the first position and the second refractive index 150 or $n_B$ acts in the second position. Different working distances may be illuminated in this way. Thus, for example, a dark field top light illumination may be adjusted in an ideal manner to a distance of an object to be measured. It is not necessary to change e.g. the illumination assembly when varying the working distance.

In the embodiment depicted in FIG. 6, the entire angle range between the first refractive index 148 or nA and the second refractive index 150 or nB may be passed over by the illumination by way of rotating the lens device by at most 15°. In this way, it is also possible to pass over a corresponding illumination distance range and the reflected light illumination, in particular a dark field top light illumination, may be set as desired. The illumination may thus be adjusted finely for variable working distances, particularly in the case of a dark field top light illumination, which is very sensitive in relation to the set illumination distance or the angle of incidence in relation to the central axis 124. A single actuator which rotates the lens device 120 relative to the illumination arrangements 88 may be sufficient in this respect.

Figure 7:
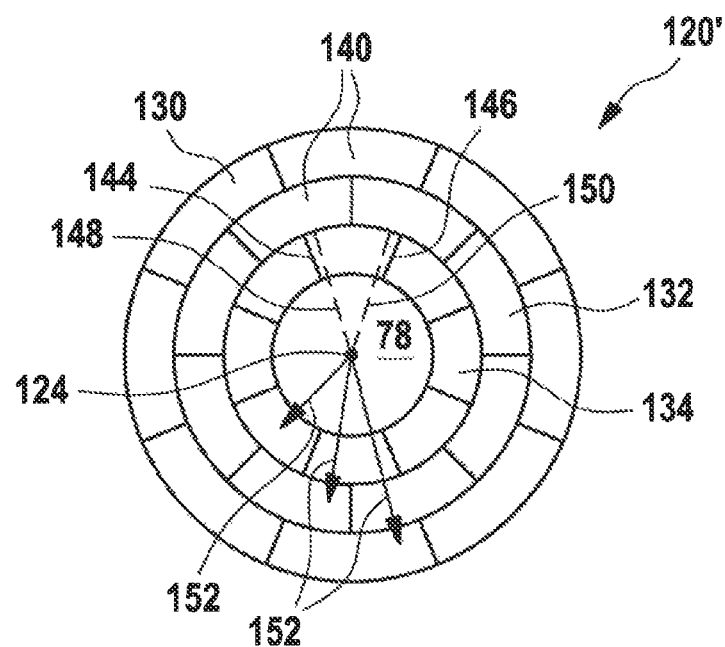
FIG. 7 shows a plan view of a schematic further embodiment of a lens device.

FIG. 7 shows a schematic plan view of a further embodiment of a lens device 120'. The lens device comprises three ring regions 130, 132, 134. These extend concentrically around the free central region 78 around the central axis 124. The refractive indices 148 or $n_A$ and 150 or $n_B$ are denoted schematically in a plan view. In the plan view of FIG. 7, it is possible to identify that all segments 140 immediately adjoin one another. This is the case in all three ring regions 130, 132, 134.

Figure 8:
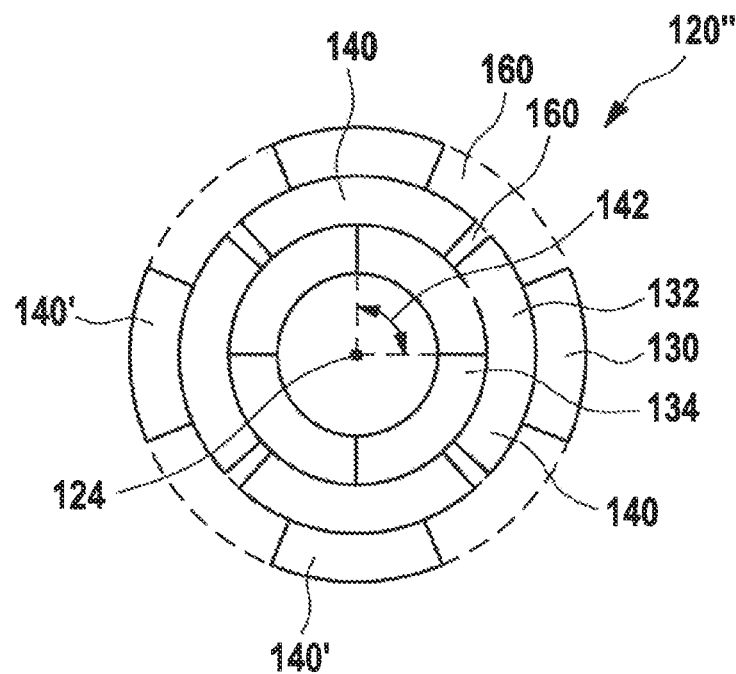
FIG. 8 shows a schematic plan view of an even further embodiment of a lens device.

FIG. 8 shows a further schematic plan view of a lens device 120". Only the differences are explained below; the same elements continue to be denoted by the same reference signs. The segments are once again arranged immediately adjoining one another in the third ring region 134. However, the segments are arranged with distances or gaps 160 therebetween in the first ring region 130 and the second ring region 132. Thus, a respective ring region 130 to 136 is then distinguished by the same radial distance 152 between the associated segments 140. However, all ring regions are complete rings in the embodiment depicted in FIG. 8.

However, in some cases there may also be, for example, a nonsymmetrical arrangement of illumination arrangements 88. By way of example, it could be the case that only two illumination arrangements are provided at the respective radial distance 152 of the first ring region 130, said illumination arrangements being assigned to the segments denoted by 140'. Then, the first ring region 130 would correspondingly only be a portion of a complete ring. However, the segments 140' would continue to be arranged at the same radial distance 152 from the central axis 124.

Figure 9:
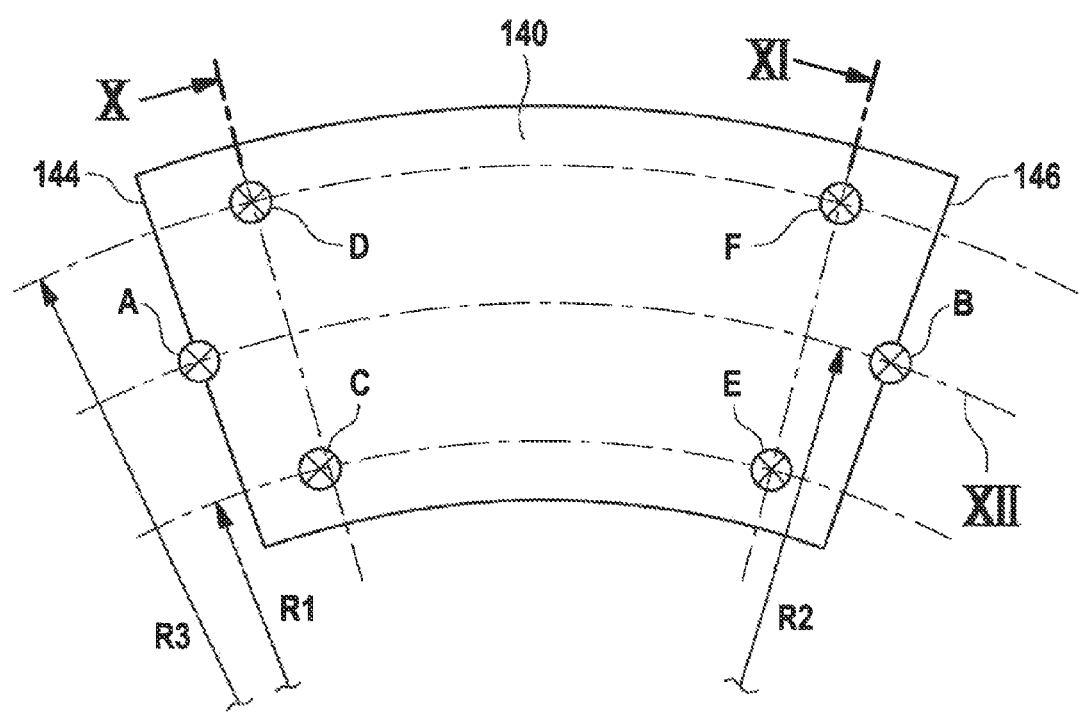
FIG. 9 shows a schematic plan view of a lens segment for explaining the curves of the refractive index.

FIG. 9 shows a plan view of an exemplary segment 140. As already explained in great deal above, a refractive surface segment is a circular arc portion of one of the ring regions. Consequently, it extends both in a radial direction R and in a circumferential or tangential direction. In principle, provision is made for a first refractive index to be provided at the first end 144 and a second refractive index, which differs from the first refractive index, to be provided at the second end 146. Two points A and B have been plotted in an exemplary manner. A lies at the first end 144 and B lies at the second end 146. Both have the same radial distance from the central axis 124. This radial distance is denoted by R2. Consequently, a refractive index $n_A$ is present at the point A. A refractive index $n_B$ is present at the point B. The refractive indices $n_A$ and $n_B$ differ from one another.

Figure 12:
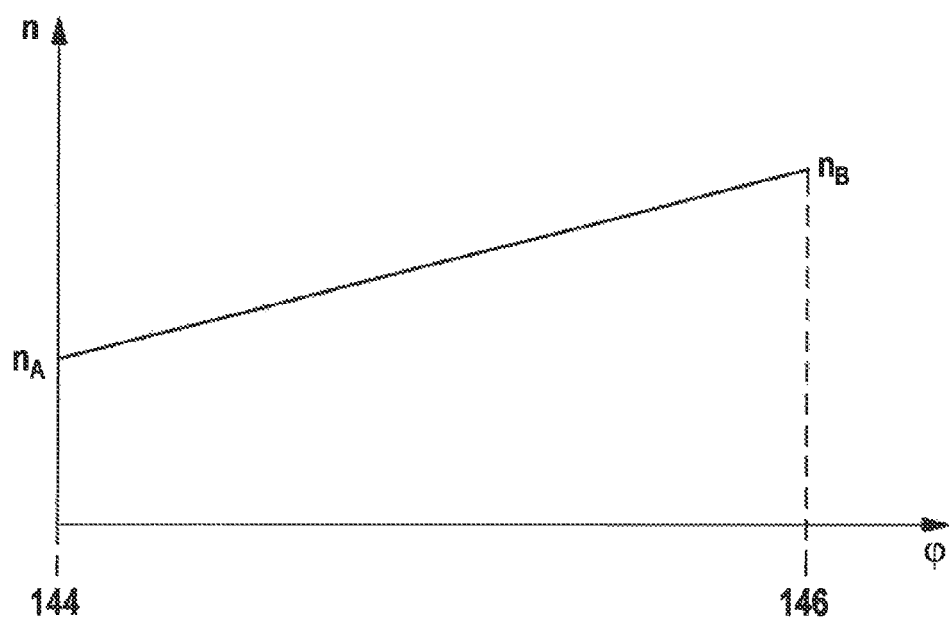
FIG. 12 shows an exemplary curve of the refractive index between points A and B in FIG. 9.

FIG. 12 depicts a curve of the refractive index between the points A and B in the circumferential direction (i.e., depicted in the direction φ). In the depicted configuration, it is possible to gather from FIG. 12 that a gradient of the refractive index has been selected to be constant. Consequently, there is a linear curve between the refractive indices $n_A$ and $n_B$.

However, this is merely exemplary. Quadratic curves or curves of a different type are also possible. In principle, a curve in a step function is also conceivable, in particular if the segment 140 is produced from a plurality of partial materials.

Furthermore, once again in view of FIG. 9, each segment 140 may also have a changing refractive index in the radial direction. An inner radius R1, which is smaller than the radius R2, is depicted here in an exemplary manner. Furthermore, a radius R3, which is greater than the radius R2, is depicted here. A curve of the refractive index which is depicted schematically in FIG. 10 is provided here between the radii R1 and R3, for example between points C and D, in the vicinity of the first end 144. The refractive index extends between a refractive index $n_C$ and a refractive index $n_D$. What can also be seen here is that the refractive index gradient is constant and that hence a linear curve of the refractive index is present between R1 and R3. In this way, it is possible, for example, to provide a strong beam deflection for small working distances, as depicted in FIG. 10. That is to say, the refractive index $n_C$ and the refractive index $n_D$ are selected to be relatively high. In particular, the refractive index $n_C$ is greater than a refractive index $n_E$ at a point E, as will still be described below. Moreover, a refractive index $n_D$ is greater than a refractive index $n_F$, which is present at the point F, as will likewise be described below with reference to FIG. 11. Moreover, the gradient at this first end 144 between points C and D is selected to be large. On account of the small working distance, the radial extent of the surface 144 plays a greater role and a greater beam deflection is required radially on the outside via point D than radially on the inside at point C in order to refract a beam, which is emitted by the illumination arrangement 88 in the exemplary illustration, by means of a corresponding lens device 120 into a first, small working distance.

Moreover, a curve at point E and at point F in the vicinity of the second end 146 is plotted in view of FIG. 9. The point E is likewise situated at the radial distance R1 from the central axis 124. The point F is likewise situated at the distance R3 from the central axis 124. The curve of the refractive index is depicted in FIG. 11. Here, a greater working distance is illuminated in the same arrangement. It is for this reason that, overall, lower refractive coefficients are required. The refractive index of the point E is therefore lower than that of the point C and the refractive index of the point F is lower than the refractive index of the point D. Moreover, the radial extent plays a smaller role here due to the different geometric conditions, and so it is also possible to select a smaller refractive index gradient, as depicted in FIG. 11.

Figure 13:
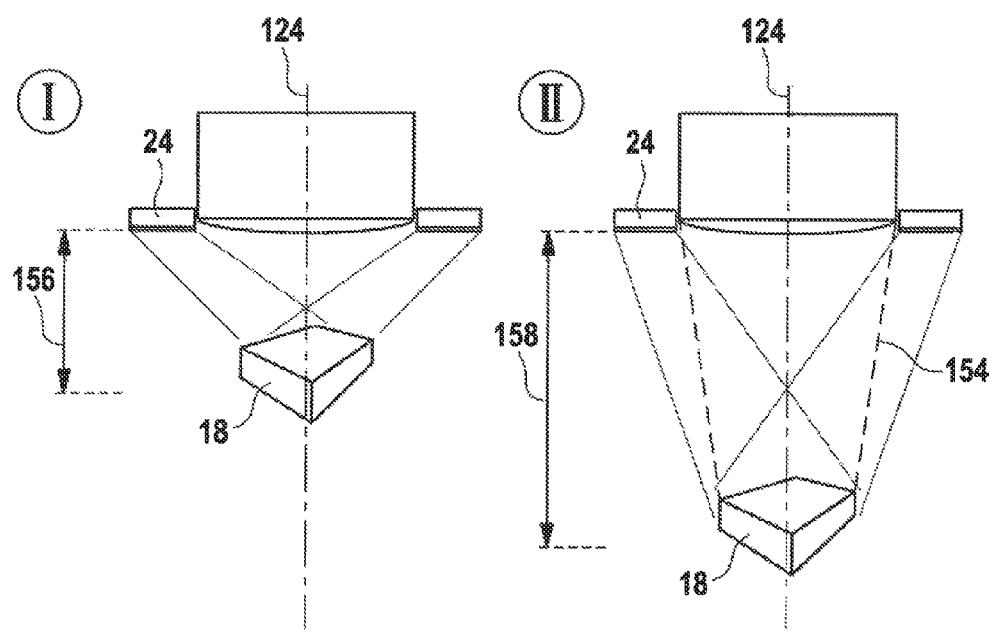
FIG. 13 shows a schematic visualization of rotating the lens device for providing a reflected light dark field illumination at different working distances.

This is once again schematically illustrated in FIG. 13. In the first position, a first working distance 156 may be illuminated as dark field top light illumination by means of an illumination assembly 24 according to the invention, which comprises a lens device 120. There is no need to interchange the illumination assembly 24 if the working distance is varied to a second working distance 158. By rotating the lens device 120 into the second position, it is possible to set the reflected light dark field illumination in an ideal manner to the new working distance 158, and so the object 18 to be measured is once again illuminated in a dark field.

Figure 14:
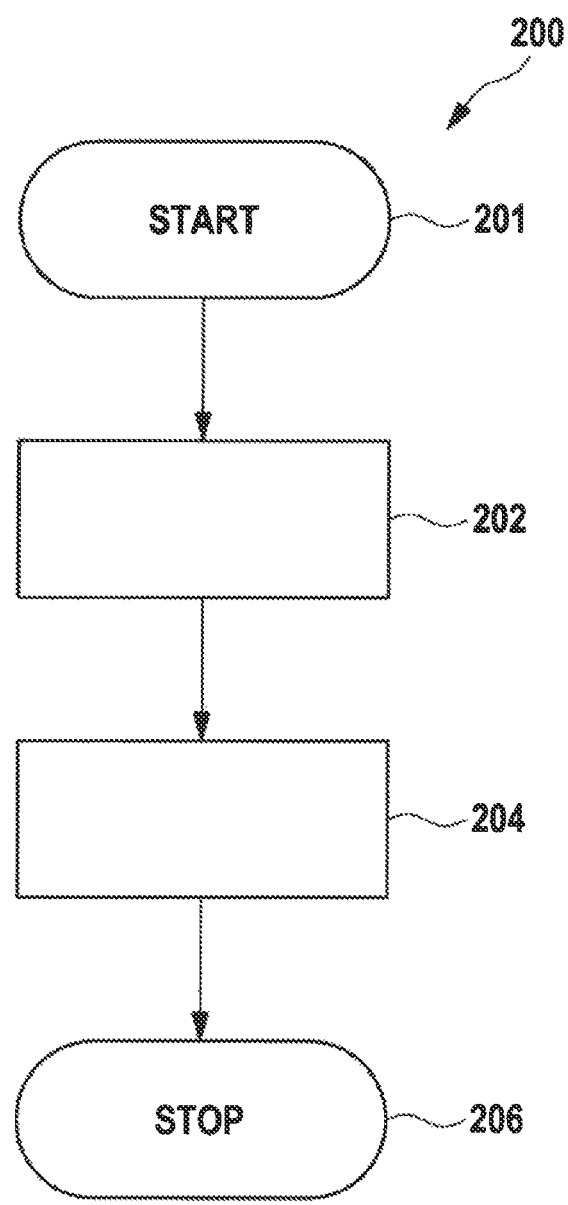
FIG. 14 shows an embodiment of a method.

Accordingly, FIG. 14 depicts an embodiment of a method for illuminating an object 18 to be measured, in particular with a dark field top light illumination. The method is denoted generally by 200. In the method, a coordinate measuring machine comprising an illumination assembly comprising a lens device is provided, wherein the lens device extends, in particular in a ring-shaped manner, along a circumferential direction about a central axis 124 of the lens device, and, finally, step 204 is carried out, wherein the lens device is rotated about the central axis 124. In particular, the central axis 124 may be an optical axis of an imaging optical unit of an optical sensor of the coordinate measuring machine. This may be the case for the central axis 124 in all configurations of the invention.

Moreover, this is preceded by a step 202, according to which a lens device 120 is provided, wherein the lens device 120 comprises at least one ring region 130, 132, 134, 136, wherein each ring region 130, 132, 134, 136 extends along a circumferential direction 138 about a central axis 124 of the lens device 120, wherein each ring region 130, 132, 134, 136 comprises a plurality of segments 140, wherein each segment 140 forms a circular arc portion 142 of a respective ring region 130, 132, 134, 136 and wherein each segment 140 comprises a first end 144 in the circumferential direction 138 and a second end 146 opposite to the first end 144 in the circumferential direction 138, wherein each segment has a first refractive index $n_A$ at a reference wavelength at the first end 144 at a first radial distance R2 from the central axis 124 and a second refractive index $n_B$ at the reference wavelength at the second end 146 at the first radial distance R2, said second refractive index differing from the first refractive index $n_A$.

What is claimed is:

1. A lens device for an illumination assembly, wherein the lens device comprises at least one ring region, wherein each ring region extends along a circumferential direction about a central axis of the lens device, wherein each ring region comprises a plurality of segments, wherein each segment forms a circular arc portion of a respective ring region, and wherein each segment comprises a first end in the circumferential direction and a second end opposite to the first end in the circumferential direction, wherein each segment has a first refractive index at a reference wavelength at the first end at a first radial distance from the central axis and a second refractive index at the reference wavelength at the second end at the first radial distance, said second refractive index differing from the first refractive index.

2. The lens device according to claim 1, wherein each segment has a refractive index gradient with a magnitude different from zero in the radial direction.

3. The lens device according to claim 2, wherein the lens device comprises a plurality of ring regions.

4. The lens device according to claim 1, wherein each segment has a refractive index gradient with a magnitude of zero in the radial direction.

5. The lens device according to claim 1, wherein each segment has a first constant refractive index gradient in the radial direction at the reference wavelength at the first end and a second constant refractive index gradient, differing from the first refractive index gradient, at the reference wavelength at the second end.

6. The lens device according to claim 1, wherein each lens segment has a constant refractive index gradient in the circumferential direction between the first end and the second end.

7. The lens device according to claim 1, wherein the lens device comprises a light-entry surface and a light-exit surface, wherein the light-entry surface and the light-exit surface extend parallel to one another.

8. The lens device according to claim 1, wherein the lens device comprises a light-entry surface and a light-exit surface, wherein the light-exit surface is inclined in the direction of the central axis by any constant angle in relation to the light-entry surface.

9. The lens device according to claim 1, wherein the lens device comprises a light-entry surface and a light-exit surface, wherein the light-exit surface is inclined in the direction of the central axis by any first angle in relation to the light-entry surface at the first end and wherein the light-exit surface is inclined in the direction of the central axis by any second angle, which differs from the first angle, in relation to the light-entry surface at the second end.

10. The lens device according to claim 1, wherein each segment is integral and has a material which is inhomogeneous in relation to a refractive index, or each segment is embodied as a number of parts which, overall, comprise at least two different materials.

11. The lens device according to claim 1, wherein the segments of a respective ring region are arranged immediately adjoining one another.

12. The lens device according to claim 1, wherein at least one ring region is a completely closed ring and/or in that at least one ring region is a portion of a ring.

13. The lens device according to claim 1, wherein each ring region is a completely closed ring.

14. The lens device according to claim 1, wherein the lens device comprises a plurality of ring regions which are arranged concentrically about the central axis.

15. The lens device according to claim 14, wherein at least two of the plurality of ring regions are arranged at different radial distances from the central axis.

16. The lens device according to claim 1, wherein the lens device overall has the form of a closed ring which is arranged around the central axis.

17. The lens device according to claim 1, wherein the lens device comprises a free central region radially within the at least one ring region.

18. The lens device according to claim 1, wherein the segments of a respective ring region of the at least one ring region are identical.

19. An illumination assembly for a measuring machine for measuring a workpiece by means of an optical sensor, comprising at least one illumination arrangement, and wherein the illumination assembly further comprises a lens device for an illumination assembly, wherein the lens device comprises at least one ring region, wherein each ring region extends along a circumferential direction about a central axis of the lens device, wherein each ring region comprises a plurality of segments, wherein each segment forms a circular arc portion of a respective ring region, and wherein each segment comprises a first end in the circumferential direction and a second end opposite to the first end in the circumferential direction, wherein each segment has a first refractive index at a reference wavelength at the first end at a first radial distance from the central axis and a second refractive index at the reference wavelength at the second end at the first radial distance, said second refractive index differing from the first refractive index.

20. The illumination assembly according to claim 19, wherein the lens device is arranged relative to the at least one illumination arrangement such that light emitted by the illumination arrangement is incident on the lens device at an angle of less than 90°.

21. A coordinate measuring machine for measuring a workpiece by means of an optical sensor, wherein the coordinate measuring machine comprises an illumination assembly for a measuring machine for measuring a workpiece by means of an optical sensor, comprising at least one illumination arrangement, and wherein the illumination assembly further comprises a lens device for an illumination assembly, wherein the lens device comprises at least one ring region, wherein each ring region extends along a circumferential direction about a central axis of the lens device, wherein each ring region comprises a plurality of segments, wherein each segment forms a circular arc portion of a respective ring region, and wherein each segment comprises a first end in the circumferential direction and a second end opposite to the first end in the circumferential direction, wherein each segment has a first refractive index at a reference wavelength at the first end at a first radial distance from the central axis and a second refractive index at the reference wavelength at the second end at the first radial distance, said second refractive index differing from the first refractive index, and wherein a measurement cone of the optical sensor extends along the central axis.

22. A method for changing an illumination working distance of a coordinate measuring machine, wherein the coordinate measuring machine comprises an illumination assembly comprising a lens device, wherein the lens device extends along a circumferential direction about a central axis of the lens device, said method comprising the following step:

Rotating the lens device about the central axis, wherein the lens device comprises at least one ring region, wherein each ring region extends along a circumferential direction about a central axis of the lens device, wherein each ring region comprises a plurality of segments, wherein each segment forms a circular arc portion of a respective ring region, and wherein each segment comprises a first end in the circumferential direction and a second end opposite to the first end in the circumferential direction, wherein each segment has a first refractive index at a reference wavelength at the first end at a first radial distance from the central axis and a second refractive index at the reference wavelength at the second end at the first radial distance, said second refractive index differing from the first refractive index.

* * * * *